United States Patent
Busler

[15] 3,678,069
[45] July 18, 1972

[54] LACTONE POLYMERIZATION WITH A DICARBOXYLIC ACID-WATER INITIATOR

[72] Inventor: William R. Busler, Bartlesville, Okla.
[73] Assignee: Phillips Petroleum Company
[22] Filed: Dec. 4, 1968
[21] Appl. No.: 781,264

[52] U.S. Cl..................260/484 A, 260/32.2, 260/77.5 AN, 260/468 R, 260/473 A
[51] Int. Cl........................................................C07c 69/66
[58] Field of Search............260/484 A, 484 R, 468 R, 473 A

[56] References Cited

UNITED STATES PATENTS

| | | | |
|---|---|---|---|
| 3,169,945 | 2/1965 | Hostettler et al. | 260/78.3 |
| 2,452,209 | 10/1948 | Rehberg et al. | 260/484 X |

FOREIGN PATENTS OR APPLICATIONS

| | | | |
|---|---|---|---|
| 674,436 | 6/1952 | Great Britain | 260/484 |

*Primary Examiner*—Lorraine A. Weinberger
*Assistant Examiner*—Paul J. Killos
*Attorney*—Young and Quigg

[57] ABSTRACT

Lactones having the formula:

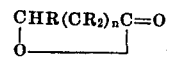

wherein $n$ is an integer from 4 to 6 and the R's are of the group consisting of hydrogen, alkyl, cycloalkyl, alkoxy, and single ring aromatic hydrocarbon radicals are polymerized with an initiator consisting of an organic dicarboxylic acid hydrate or anhydrous dicarboxylic acid and water to produce a product having at least two substantially linear units of the formula:

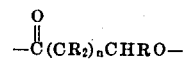

wherein the variables $n$ and R have the aforesaid meanings.

9 Claims, No Drawings

LACTONE POLYMERIZATION WITH A DICARBOXYLIC ACID-WATER INITIATOR

This invention relates to a method of polymerizing lactones. In another aspect, this invention relates to a method of polymerizing lactones with dicarboxylic acid and water.

I have discovered that lactones can be polymerized in the presence of dicarboxylic acid and water. The polyesters prepared in this manner have a relatively high molecular weight in relationship to the small amount of dicarboxylic acid initiator used. Analysis indicates that both hydroxyl and carboxyl groups are present in the polyester.

Dicarboxylic acid-water polymerized lactones are valuable since such initiation affords a means of preparing carboxyl and hydroxyl terminated polyesters. These polyesters have utility as intermediates for reactions in the preparation of elastomers and foams, and are particularly useful as plasticizers for PVC and other resins.

Accordingly, it is an object of my invention to provide a method for the polymerization of lactones. It is another object of my invention to provide a method for polymerization of lactones by addition of dicarboxylic acid and water to the lactone, either by the addition of an acid hydrate or by addition of an anhydrous acid and water.

Other objects, advantages and features of my invention will become obvious to one skilled in the art from the following disclosure and claims.

The lactone used as a starting material may be any lactone, or combination of lactones, having at least six carbon atoms, preferably from six to eight carbon atoms, in the ring and at least one hydrogen atom on the carbon atom which is attached to the oxygen atom in said ring. In one aspect, the lactone used as starting material can be represented by the general formula:

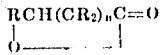

in which $n$ is at least 4, preferably from 4 to 6, at least $n+2$, of the R radicals are hydrogen, and the remaining R's are substituents selected from the group consisting of hydrogen, alkyl, cycloalkyl, alkoxy and aryl and combinations thereof such as alkylcycloalkyl, alkylaryl, etc. radicals. Lactones having greater numbers of substituents other than hydrogen on the ring, and lactones having five or less carbon atoms in the ring, are generally unsuitable for the purposes of the invention because of the tendency that polymers thereof have to revert to the monomer, particularly at elevated temperature.

The lactones preferred in this invention are the epsilon-capro-lactones having the general formula:

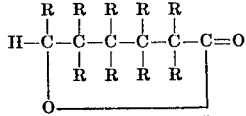

wherein at least six of the R's are hydrogen and the remainder are hydrogen, alkyl, cycloalkyl, alkoxy or aryl radicals, and the total number of carbon atoms in the substituents on a lactone ring does not exceed about 12. Unsubstituted epsilon-caprolactone, in which all the R's are hydrogen, is derived from 6-hydroxyhexanoic acid. Substituted epsilon-caprolactones, and mixtures thereof, are available by reacting a corresponding substituted cyclohexanone with an oxidizing agent such as peracetic acid. The cyclohexanones may be obtained from substituted phenols or by other convenient synthetic routes.

Among the substituted epsilon-caprolactones considered most suitable for the purposes of the invention are the various monoalkyl epsilon-caprolactones such as the monomethyl-, monethyl-, monopropyl-, monoisopropyl-, etc. to monododecyl epsilon-caprolactones; dialkyl epsilon-caprolactones in which the two alkyl groups are substituted on the same or different carbon atoms; trialkyl epsilon-caprolactones in which two or three carbon atoms in the lactone ring are substituted; alkoxy epsilon-caprolactones such as methoxy and ethoxy epsilon-caprolactones; and cycloalkyl, aryl, and aralkyl epsilon-caprolactones such as cyclohexyl, phenyl and benzyl epsilon-caprolactones.

Lactones having more than six carbon atoms in the ring, e.g., zeta-enatholactone and eta-caprylolactone can also be polymerized in accordance with the method of the invention.

The dicarboxylic acids that can be used as lactone polymerization initiators have a pKa for the first ionization of about 3 or less. The definition of pKa is:

$$pKa = -\log Ka$$

where Ka is the equilibrium constant for the following reaction:

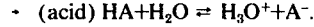

The dicarboxylic acids that can be employed in this invention also contain from about two to about 12 carbon atoms, are saturated or unsaturated, aliphatic or cycloaliphatic and can contain substituents such as a halogen or oxirane.

Suitable examples are oxalic, malonic, ethylmalonic, isopropylmalonic, methylethylmalonic, diethylmalonic, ethyl-n-propylmalonic, di-n-propylmalonic, maleic, citraconic, acetylenedicarboxylic, bromomaleic, bromofumaric, chloromaleic, chlorofumaric, cis-caronic, cis-ethyleneoxidedicarboxylic, or transethyleneoxidedicarboxylic acid, and the like.

The polyesters prepared according to the method of this invention have at least two substantially linear units of the formula

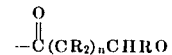

wherein the variables $n$ and R have the aforesaid meanings.

The polymerization of this invention can be carried out in the presence of a diluent, if desired. The diluents that can be employed in this invention are inert hydrocarbons containing from four to 10 carbon atoms per molecule. Suitable diluents are n-butane, n-decane, n-hexane, cyclohexane, benzene, toluene 1,3-diethylbenze, and the like. Mixtures of these diluents can also be employed.

The lactone is charged to the reaction zone containing the initiator and diluent, if any is used. The mixture is agitated during polymerization at a temperature ranging from 0° to 150° C, preferably from 50° to 100° C. The concentration of initiator is in a range from 5 to 100 gram millimoles of dicarboxylic acid per 100 grams of lactone (mhm), preferably from 10 to 50 mhm. The amount of water employed with the aforementioned dicarboxylic acids is generally in the range of from 0.5 gram millimole to 4 millimoles, preferably 1 to 2 millimoles, per millimole of dicarboxylic acid employed. The polyester can be recovered either by evaporation of the diluent and unreacted lactone or by precipitation of the polymer with methanol or other suitable non-solvent for the polymer and drying in a vacuum oven.

The polyesters prepared according to the method of this invention can be used as intermediates in the preparation of polyurethanes by reaction of the hydroxyl and carboxyl end groups with di- or polyisocyanates according to procedures well known in the art. For such applications these polymers can be reacted with diisocyanates and/or polyisocyanates in the presence of amine catalysts under conditions well known in the art to produce the polyurethanes. For example, in the presence of blowing agents and surfactants, flexible or rigid polyurethane foams can be prepared. The flexible polyurethane foams are used widely in the automobile and furniture industry for seat cushioning and safety padding. Other flexible foam applications include filters, sponges, toys, applicators, and medical dressings. The rigid polyurethane foams are widely used in the appliance, construction, and transportation industry for insulation. Likewise, polyurethane elastomers can be made under conditions known in the art employing the reaction of the polyesters of this invention with di- and/or polyisocyanates in the presence of amine catalysts. Said polyurethane elastomers can be employed to prepare solid tires, vibration dampers, conveyor rolls and bearings, sprockets and gears. In any of the above applications various materials such as flame retardants, fillers, extenders, pigments, and bacteriostats can also be added as desired to the particular polyurethane formulation in the conventional manner.

The polyesters of this invention are also useful as plasticizers in polyvinyl chloride (PVC) and other resins. For example, in plasticizing PVC an amount of from about 5 to about 50 parts by weight of the polyester per 100 parts by weight of the PVC would normally be employed. The plasticizer converts the hard and horny PVC resin into a flexible material that can be readily worked in the many applications which require such flexibility. These polymeric plasticizers are of particular importance in PVC applications in which the high temperature flexibility is important, i.e., said plasticizers have a lower tendency to migrate and have lower extractability under such conditions than the usual lower molecular weight plasticizer esters.

The product described in Run 2 of Example II could be used in the form of casting as a potting compound to protect electrical components in appliances, instruments and the like.

In addition to the previously stated advantages, the method of this invention has the advantage of control over the average molecular weight of the formed polyester. The advantage is achieved by pre-selecting the molar portions of initiator and lactone.

The advantages of this invention are further illustrated by the following examples. The reactants, proportions and other specific conditions are presented as being typical and should not be construed to limit the invention unduly.

EXAMPLE I 100 parts of epsilon-caprolactone were charged to bottle reactors containing varying amounts of oxalic acid dihydrate as indicated in Table I. The polymerization took place at a temperature of 70° C for a time of 20 hours. Each reaction mixture was stirred with methanol and the polymeric product separated and dried under vacuum at 60° C.

TABLE I

| Run No. | Oxalic Acid Dihydrate, mhm | Conversion % | Carboxyl % | Hydroxyl % | Melting Point, °C |
|---|---|---|---|---|---|
| 1 | 30 | 100 | 3.18 | 1.52 | 61–63 |
| 2 | 21 | 79 | 4.27 | 2.89 | 57–60 |
| 3 | 12 | 9 | —* | — | — |
| 4 | 6 | trace | — | — | — |
| 5 | 3 | trace | — | — | — |

*Conversion was not sufficient to determine these properties of the formed polyesters.

The total active hydrogen content was determined by gas chromatographic analysis of the amount of hydrogen liberated in a titration of a known amount of the polymer employing LiAlH$_4$ as the titrant.

The total carboxyl content was then determined by a modification of the method of Fritz and Lisicki in Analytical Chemistry, 23, 589 (1951), by titration of a known amount of polymer with sodium methoxide in pyridine.

The hydroxyl content was then determined by the difference between the total active hydrogen content and the carboxyl content.

EXAMPLE II

The polymer of epsilon-caprolactone prepared in Run 2 of Example I was reacted with toluene diisocyanate in order to demonstrate the presence of hydroxyl and carboxyl groups in the polyester (2.89 percent and 4.27 percent, respectively). These runs were conducted according to the recipe and procedures described below:

| Recipe | Amount |
|---|---|
| Polyester of Run 2, Example I | 2 g. |
| N,N-Dimethylformamide | 10 ml. |
| Toluene-2,4-diisocyanate (TDI), ml. | variable |
| Temperature, °C | 80 |
| Time, hours | 20 |

TABLE II

| Run No. | TDI ml. | Observation during reaction | Product melting point, °C |
|---|---|---|---|
| 1(control) | 0 | No change in mixture viscosity | 55 |
| 2 | 0.80 | Mixture viscosity increased | >250 |

At the conclusion of the reaction period each mixture was stirred with methanol and the polymeric products separated and dried at 60° C. 1, The results demonstrate that the polyester prepared in Run 2 of Example I reacts with diisocyanates to form a very high melting product (polyurethane) and further demonstrates the presence of terminal hydroxyl 1, carboxyl groups in the aforesaid polyester. In the absence of diisocyanate the polyester was recovered essentially unchanged (Run No. 1, Table II).

EXAMPLE III

Runs were conducted in which epsilon-caprolactone was polymerized with water alone as an initiator or with oxalic acid dihydrate according to this invention. The recipe and results are shown below:

| Recipe | Parts by weight |
|---|---|
| epsilon-Caprolactone | 100 |
| Initiator | variable |
| Temperature, °C | 70 |
| Time, hours | 24 |

TABLE III

| Run No. | Initiator (mhm)[a] | Conversion, % Methanol soluble | Methanol insoluble |
|---|---|---|---|
| 1 | Oxalic acid dihydrate (30) | 17 | 83 |
| 2 | Water (60) | 96 | 4 |

(a) mhm = gram millimoles per 100 grams of monomer.

At the conclusion of each run the reaction mixture was stirred with methanol and the insoluble polymer separated, dried, and weighed. The methanol soluble fraction of each polymer product was isolated by evaporation of the methanol and the residue remaining then dried and weighed. Although conversion to polymer in each run was 100 percent, the striking difference in methanol solubility of the products demonstrates that oxalic acid dihydrate produced a polyester of significantly higher molecular weight than water alone.

EXAMPLE IV

Other runs were conducted in which epsilon-caprolactone was polymerized employing anhydrous oxalic acid and varying amounts of water as cocatalyst. The recipe and results are shown below:

| Recipe | Parts by weight |
| --- | --- |
| epsilon-Caprolactone | 100 |
| Oxalic acid (anhydrous)[a] | 30 mhm |
| Water | variable |
| Temperature, °C | 70 |
| Time, hours | 16 |

[a] Prepared by dehydration over concentrated sulfuric acid in a desiccator at 80° C for three days. A 0.6 g sample of the dehydrated acid when exposed to moist air gained weight to a constant 0.838 g which closely corresponds to a theoretical weight gain to 0.840 g for the dihydrated. This result indicates the oxalic acid thus treated was essentially anhydrous.

TABLE IV

| Run No. | Water mhm | Conversion, % | Product Description |
| --- | --- | --- | --- |
| 1 | 0 | 75 | Sticky semi-solid |
| 2 | 7.5 | 75 | Sticky semi-solid |
| 3 | 30 | 100 | Hard solid |
| 4 | 60 | 100 | Hand Solid |

The runs in Table IV were conducted by first charging the lactone to the bottle reactor followed by oxalic acid and then water. Temperature was adjusted to 70° C for the time indicated. Polymeric products were isolated from each run according to the procedure of Example I.

The results in Table IV demonstrate that increased conversion to higher molecular weight polyester is achieved when the amount of water employed as cocatalyst is present in an amount at least equivalent to about 1 millimole per millimole of dicarboxylic acid.

Reasonable variations and modifications are possible within the scope of this disclosure without departing from the spirit and scope thereof.

I claim:

1. A process which comprises admixing a lactone of the formula:

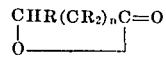

wherein $n$ is an integer from 4 to 6 and each R is hydrogen or an alkyl, cycloalkyl, alkoxy, or a single ring aromatic hydrocarbon radical; with an organic initiator consisting of dicarboxylic acid hydrates or anhydrous dicarboxylic acid and 0.5–4 gram millimole of water per millimole of anhydrous dicarboxylic acid; said acid having a pKa for the first ionization of about 3 or less; to a temperature in the range of about 0 to about 150° C; said lactone being in molar excess with relation to said initiator to produce a product having at least two substantially linear groups of the formula:

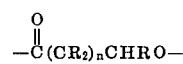

wherein the variables $n$ and R have the aforesaid meanings.

2. The process of claim 1 wherein 1–2 gram millimoles of said water is employed per millimole of anhydrous dicarboxylic acid.
3. The process of claim 2 wherein said lactone is epsilon-caprolactone.
4. The process of claim 3 wherein said initiator is oxalic acid dihydrate.
5. The process of claim 3 wherein said initiator is anhydrous oxalic acid.
6. The product of the process of claim 2.
7. The product of claim 6 wherein said lactone is epsilon-caprolactone.
8. The product of claim 7 wherein said initiator is oxalic acid dihydrate.
9. The product of claim 7 wherein said initiator in anhydrous oxalic acid.

* * * * *